United States Patent [19]

Kulander

[11] Patent Number: 4,840,314

[45] Date of Patent: Jun. 20, 1989

[54] TREATMENT OF MERCURIAL WASTE

[75] Inventor: Hans Kulander, Saltvik, Sweden

[73] Assignee: MRT System Aktiebolag, Sweden

[21] Appl. No.: 175,256

[22] Filed: Mar. 30, 1988

[30] Foreign Application Priority Data

Apr. 16, 1987 [SE] Sweden .................................. 8701613

[51] Int. Cl.$^4$ .............................................. B02C 19/14
[52] U.S. Cl. ........................................ 241/24; 241/25; 241/99
[58] Field of Search .................... 241/24, 99, DIG. 14, 241/194, 25

[56] References Cited

U.S. PATENT DOCUMENTS 2,628,036 2/1953 Hall ................................. 241/194 X Primary Examiner—Mark Rosenbaum
Attorney, Agent, or Firm—Roylance, Abrams, Berdo & Goodman

[57] ABSTRACT

A method for separating mercurial waste from scrapped gas discharge lamp bulbs and other mercury-containing lamps. Expanded, broken lamps are crushed and conveyed to a vibrating screen. The crushed material is shaken on a sieve-cloth having a mesh width of 0.2–1.0 mm, preferably 0.25 mm, for at least 1–3 minutes. The major part of the crushed material remains on the screen and is removed therefrom as mercury-free waste (Hg-content < 10 ppm), whereas substantially all the mercury present is found in the finer fraction which passes through the screen.

12 Claims, 1 Drawing Sheet

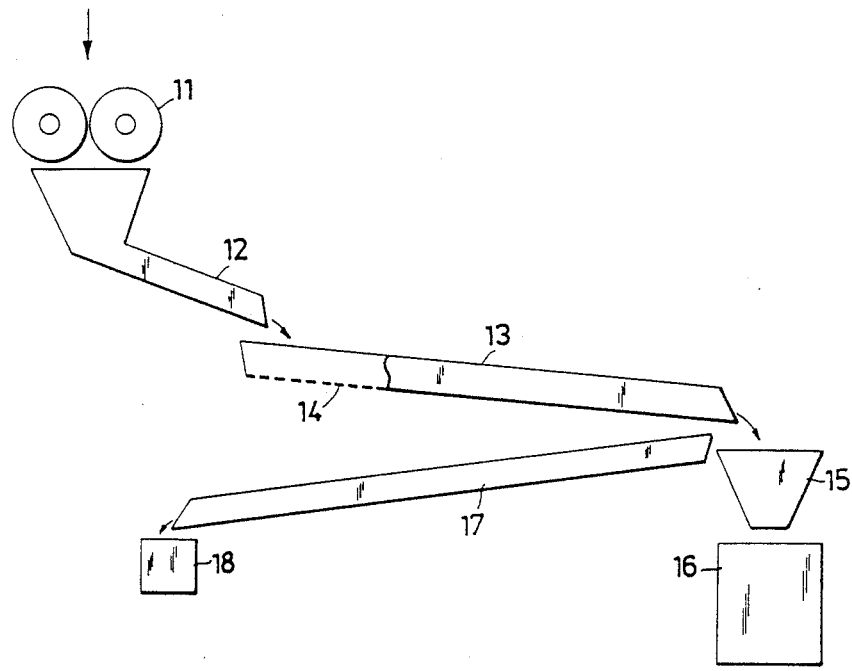

TREATMENT OF MERCURIAL WASTE

FIELD OF THE INVENTION

The present invention relates to a method for separating mercurial waste from rejected mercury vapour discharge lamps and other lamps that contain mercury.

BACKGROUND OF THE INVENTION

Mercury is a necessary constituent of a number of gas discharge lamps and also of many other kinds of lamps. A common feature of such lamps is that they have an internal pressure which is sufficiently low to convert the mercury to vapour form. Should the glass tube or envelope of such lamps fracture, the mercury will condense rapidly onto the glass, and more specifically onto the luminescent powder with which such lamps are normally coated. A certain amount of mercury will also preecipitate onto the socket connection, lamp electrodes, etc. Since mercury is one of the most serious environmental poisons, it is necessary to process and handle lamps which contain mercury in a manner which will ensure that the mercury does not escape to the surroundings.

The method most commonly practiced in this regard is still one in which the waste is deposited in a controlled form in separate organized collecting stations. One method used to recover mercury from mercurial lamp waste comprises the steps of crushing the lamps and distilling off the mercury. The treatment is carried out batchwise in impervious, sealed containers, to which gaseous nitrogen is supplied and which are heated and placed under a vacuum. The mercury present is converted to vapour and departs through a bottom outlet and condenses in a cooling trap. This method is described and illustrated in U.S. Pat. No. 4,268,306. However, although the mercury is separated from the scrap very effectively by means of this method, the process involved is slow, taking about 9 hours to complete each batch of 120 liters. This slowness renders the method expensive and thus prohibits its introduction into all destruction plants or other establishments which treat or process scrapped mercury gas discharge lamps and lamps of other kinds. One method of reducing the cost of treatment in the distillation chamber and of rendering destruction more positive, is to divide the waste into separate batches of different mercury contents. One such method is described in U.S. Pat. No. 4,715,838 and comprises the steps of removing the mercury-contaminated luminescent powder from the actual glass bulb or tube of the lamp. This reduces the mercury content of the tube to a level which enables it to be treated as standard glass scrap. The luminescent powder removed may then either be dumped, cleared or re-used. This latter method has been found very effective, particularly in the case of gas discharge lamp factories in which the scrapped discharge bulbs or tubes are always whole and clean. The method, however, cannot be used to the same high level of efficiency when the bulbs involved are dirty and broken. Furthermore, the use of mercury in lamps other than the traditional glass tube lamp is progressively increasing.

OBJECTS OF THE INVENTION

An object of the present invention is therefore to provide a method for reducing that part of lamp waste which must be stored in controlled forms, or which must be further cleaned, and also to provide a method which can be applied to all kinds of mercurial lamps, irrespective of whether the lamps are whole, broken, clean or dirty. Further objects of the invention and advantages afforded thereby will be evident from the following description, and are realized by means of the method of the invention.

BRIEF DESCRIPTION OF THE DRAWING

The invention will now be described in more detail with reference to the accompanying drawings also forming a part of this disclosure, the single FIGURE of which is a side schematic view of a plant for separating mercurial waste in accordance with the present invention.

DETAILED DESCRIPTION

The illustrated plant comprises a crusher 11 which is capable of grinding or crushing the lamps to a glass debris having a maximum particle size of 1–2 cm, preferably about 1.5 cm. The arrangement should be completely closed, since mercury vapour is released when crushing the lamps. The crushed material is conveyed with the aid of suitable apparatus 12 to a vibratory screen 13, which in the illustrated embodiment has the form of a screening table provided with a sieve-cloth 14. The sieve-cloth 14 preferably has a mesh width smaller than 1 mm, suitably within the range of about 0.2–0.3 mm. A particularly suitable mesh width is 0.25 mm, at which approximately 5% by weight of the material will pass through the sieve-cloth while 95% by weight will remain on the upper surface of the table and be vibrated down into a collecting hopper 15, from where it is charged into a dumping vessel 16. The finer fraction falls into a tray 17 located beneath the sieve or screen, and is collected in a suitable vessel 18.

Tests have been carried out in which 1 kg of tube waste was divided up into the following fractions, which were then analysed with regard to their mercury contents.

| Fraction | Total weight (g) | Weight Hg μg | (ppm) |
| --- | --- | --- | --- |
| >2 mm | 587.5 | 469.5 | 0.79 |
| 2–1 mm | 204.9 | 244.8 | 1.19 |
| 1–0.5 mm | 125.0 | 150.5 | 1.20 |
| 0.5–0.25 mm | 49.4 | 148.5 | 3.01 |
| 0.25–0.125 mm | 18.7 | 28 731.9 | 1536.5 |
| 0.125–0.063 mm | 7.6 | 48 796.2 | 6420.5 |
| <0.063 mm | 7.0 | 7 022.5 | 1003.2 |
| | 1000.1 g | 85 563.9 μg | |

It will be seen from the table that there is a very pronounced increase in the mercury content of the fractions whose particle sizes are less than about 0.25 mm. This is because the major part of the mercury is present in the luminescent powder, the major part of which is shaken loose from the broken glass during the vibratory screening process. In order for the luminescent powder to be shaken loose from the broken glass during the vibratory screening process. In order for the luminescent powder to be shaken loose in the manner intended, the crushed material is preferably held on the sieve-cloth for at least 1–3 minutes, preferably at least 2 minutes. It is assumed here that screening of the material is effected in a conventional manner, e.g. on a conventional gravel sieve. A normal limit for the definition of mercurial waste is that the waste shall contain more than 10 ppm mercury. If the mercury content is less than 10 ppm, the material is considered to be free of mercury. It will be seen from the table that by using a mesh size of 2 mm, the major part of the material can be sorted and treated as mercury-free material. However, to minimize the amount of waste which requires further treatment in a particular manner, there is preferably selected a mesh size of about 0.25 mm, therewith enabling about 95 % of the crushed material to be sorted out, and only about 5 % which needs to be subjected to further treatment.

In addition to mercury, lamp waste may also contain harmful quantities of cadmium and antimony. However, when practicing the method according to the invention these substances will also be concentrated in the finer fractions. Thus, both the cadmium content and the antimony content will be less than about 10 ppm in the mercury-free material sorted in accordance with the aforesaid definition. The finer mercurial material is preferably treated in a mercury distsiller in a manner to recover pure mercury, the residue material being dumped or stored under controlled forms should the content of other poisons be excessively large.

It will be understood that the invention is not restricted to the described and illustrated embodiment thereof, and that modifications can be made within the scope of the following claims. For example, the mesh sizes may be varied in a manner to afford suitably separation of mercury when treating lamp wastes of different mercury contents.

I claim:

1. A method of separating mercurial waste from scrapped metal vapor discharge lamps of the type which are coated with luminescent powder on their inside glass surfaces, comprising the steps of crushing the lamps into particles, separating the crushed particles into a relatively coarse first fraction and a relatively fine second fraction, said relatively coarse first fraction having a particle size larger than a range of about 0.2 to 1.0 mm and being essentially free of the mercury in said scrapped lamps, said relatively fine second fraction having a particle size less than said range of about 0.2 to 1.0 mm and containing substantially all of the mercury in said scrapped lamps, said separation step being performed with the use of vibrating screen means, and both of said steps of crushing and separating being performed dry and on essentially said scrapped lamps only.

2. The method of claim 1, wherein said first fraction has a particle size larger than a range of about 0.2 –0.5 mm and said second fraction has a particle size less than a range of about 0.2–0.5 mm.

3. The method of claim 1, wherein said first fraction has a particle size larger than a range of about 0.2 –0.3 mm and said second fraction has a particle size less than a range of about 0.2–0.3 mm.

4. The method of claim 1, wherein said first fraction has a particle size larger than about 0.25 mm and said second fraction has a particle size less than about 0.25 mm.

5. The method of claim 1, and the step of selecting the mesh width of said screen to be less than about 1 mm.

6. The method of claim 5, and the step of selecting said mesh width to be in the range of about 0.2 mm to about 0.3 mm.

7. The method of claim 6, and the step of selecting said mesh width to be about 0.25 mm.

8. The method of claim 1, and the step of performing said vibrating screen separating step for a predetermined time of about 1 minute to about 3 minutes.

9. The method of claim 8, and the step of performing said vibrating screen separating step for a predetermined time of about 2 minutes.

10. The method of claim 1, and performing said crushing step so that said particles have a maximum size of about 3 cm.

11. The method of claim 10 and performing said crushing step so that said particles have a size of about 1 cm to about 2 cm.

12. The method of claim 1, and the further step of distilling said second relatively fine fraction to recover substantially pure mercury.

* * * * *